Patented Jan. 2, 1923.

1,440,727

UNITED STATES PATENT OFFICE.

MAHLON E. FAUST, OF LOS ANGELES, CALIFORNIA.

PROCESS OF TREATING GARBAGE.

No Drawing. Application filed August 6, 1918. Serial No. 248,508.

*To all whom it may concern:*

Be it known that I, MAHLON E. FAUST, a citizen of the United States, residing at Los Angeles, in the county of Los Angeles and State of California, have invented a new and useful Process of Treating Garbage, of which the following is a specification.

This invention relates to the conversion of garbage or food refuse into food having high nutritive value for poultry, hogs and other live stock, and for the production of several other important products from the garbage.

An object of the invention is to recover from garbage all of the food values so as to prevent waste.

Another object is to produce food of this character entirely free from germs detrimental to the health of the animals to which the food is fed.

Another object is to convert the garbage into food by a process of comparatively great simplicity and low cost.

Another object is to save and recover substantially all of the fats originally contained in the garbage.

Another object is to convert a certain percentage of the garbage into alcohol without spoiling the remainder of it so that the remainder can be used as a food for live stock.

Other objects and advantages will appear in the subjoined detailed description.

This new process of converting garbage into food is performed as follows: The garbage collected from residences, hotels, cafés and other places will be dumped onto a floor or table where it will be sorted and the foreign or unnutritious matter such as paper, wood and the like will be separated from the edible material. Then the garbage will be fed into a suitable cooker or drier. The cooker is preferably of the steam jacketed type so that different degrees of temperature can be readily obtained and the temperatures can be readily governed. A temperature of as high as 400° F. may be secured in the drier when so desired, the steam supplied to the jacket thereof being superheated, when necessary, for securing such relatively high temperatures. The drier, for instance, may be of the rotary-blade type and thus the material while being cooked will be stirred and more or less homogenized.

The garbage will be cooked at substantially 312° F. for a period of several hours to drive off a large percentage of the watery vapor and such vapor may be sucked from the cooker by means of an exhaust pump or fan.

The watery vapor is collected and cooled in a suitable condenser so as to condense said vapor, and the condensate may be used in the further treatment of the garbage, as will be explained hereinafter.

The garbage in the cooker will be cooked to the consistency of a wet mash or of wet clay as used for making bricks so as to liquefy the fats in the garbage and this wet mash will then be removed from the cooker and placed in a suitable press whereby considerable pressure is applied to the wet mash so as to express therefrom a large percentage of the liquefied fat which the preliminary cooking has freed from the rest of the material in the garbage. The press employed may be, for instance, of the type employed in expressing olive oil from olives, or any other type of press that answers the purpose may be employed. After the fats have thus been expressed from the wet mash, the material is taken from the press and again placed in the cooker where the cooking operation is continued. If the garbage were cooked continuously from the beginning until all the moisture was driven off, a large percentage of the fats would be vaporized or carried off by the steam and therefore wasted, but by this process the preliminary cooking is only carried to a point where the vapor given off is substantially free from fatty matter. Thus the length of time of the preliminary cooking is regulated within the judgment and experience of the operator.

The garbage will be cooked for the second time until dry and then superheated steam will be supplied to the jacket of the cooker for from five to ten minutes so as to completely sterilize the garbage and insure that all disease germs or microorganisms in the cooked mass are destroyed.

During the latter part of the cooking operation those fats remaining in the garbage after the pressing operation will coalesce with those solids which are capable of absorbing them, and the bread stuffs and other amylaceous substances are in reality toasted.

After the foregoing described operations are completed the cooked, sterilized and dried material, from which a large percentage of the fats has been removed, is discharged from the cooker and may be used to feed stock without further treatment. However, it is preferably fed into a suitable grinder. The material that has been taken from the cooker is very dry and therefore, when comminuted or ground in the grinder, the ground product is of granular character and contains very little moisture and is of a brown color. This granular product may then be employed just as it comes from the grinder, as feed for poultry, hogs and other stock, or, if desired, the ground protein content may be increased by adding fish meal and the carbohydrates may be increased by adding potatoes, corn or wheat so as to produce a balanced ration such as employed in feeding poultry.

The foregoing described process is an improvement on Patent No. 1,254,317, for Process of converting garbage into food, dated January 22, 1918, and this present process so far described differs from the above identified patented process by reason of the garbage, according to the present process, being cooked to a certain degree to liquefy the fats and then pressing some of the liquefied fats out of the garbage before finishing the cooking thereof.

Particular attention is directed to the fact that drying the material before grinding facilitates grinding the material into a suitable desired form ready for use as stock feed or for the production of alcohol which will be described hereinafter.

By employing a cooker of the type described, it is clear that the garbage is cooked to a dry form and that it is thoroughly sterilized when in the dry form by the relatively high temperature obtained by the use of superheated steam or other source of high temperature heat.

In addition to the steps above described, in some instances I propose to convert a certain percentage of the garbage into alcohol and for this purpose after the cooked, sterilized and dried material, less the facts expressed therefrom, has been removed from the cooker, it is placed in a vat or other suitable container and a ferment-inducing agent is added to the material in the vat and the mass is allowed to ferment. Yeast may be employed as the fermenting agent and of course a sufficient amount of water will be added to facilitate the fermenting action.

The water employed may be fresh water, though preferably I turn onto the material in the vat the condensate resulting from the watery vapor driven off of the garbage in the first cooking operation as above described. This condensate is quite acid and by using it the yield of alcohol is greater than when fresh water is employed, because of the hydrolytic ferment of the starch and cellulose, the spontaneous fermentation of the garbage before treatment and the greater activity of the yeast in a slightly acid medium.

After fermentation, the alcohol produced thereby is separated from the solids and then the solids are dried and may be used as food for live stock.

One way of separating the alcohol from the solids is to place the mixture of ground material, water and ferment-inducing agent in the cooker or drier previously employed or in another corresponding one and cook it an collect and cool the resulting alcoholic vapors in a suitable condenser. This produces an alcohol substantially 80 percent pure. If a higher grade alcohol is wanted it may be obtained by redistilling the 80 percent grade in a manner well understood in the art pertaining to the purification of alcohol. This third cooking of the material may be carried on until the material is dry and said material is then suitable to be used as stock feed.

It is understood that the fermentation step may be effected, if desired, without first expressing the fats from the partly cooked garbage, but in most instances it is preferable to first express said fats so that they will not interfere with or retard the fermentation. I have discovered that, by cooking the garbage until dry or, in other words, toasting it, the yield of alcohol is much greater than if the garbage is fermented without thus first drying it. The reason for this may be that the drying in this manner produces dextrose which is a form of sugar.

From the foregoing it is clear that garbage treated by my improved process may be caused to yield a variety of valuable products, namely, fats, alcohol and stock feed, and that the food value of the feed is not in anywise impaired by the fat extracting and alcohol producing operations. If the fats and alcohol are removed from the garbage, of course the food value thereof may not be quite so high as when the fats and alcohol are allowed to remain in the garbage, but the market value of the garbage thus treated for fats and alcohol is much greater than if it were all converted into stock feed as disclosed in the above mentioned patent.

Garbage treated as above described becomes an important source of alcohol and glycerine (derived from the fats). In previously known processes for obtaining fats from garbage, gasoline is employed in the extracting of the fats. My process is simpler and does not have a vitiating effect on the solids which are left and which accordingly constitutes a better stock feed than the solids remaining after treatment with gasoline or other vehicle.

By this process the fats that by the hereinbefore mentioned patented process escaped with the watery vapor are saved and readily separated from the remaining material.

I claim:

1. In the process of treating garbage, the combination of steps consisting in driving off some of the moisture from the garbage, liquefying some of the fats contained in the garbage, condensing moisture thus driven off, expressing the fats thus liquefied, drying the garbage, grinding the dried material, mixing the ground material with the condensate, producing alcoholic fermentation of the mixture, heating the mixture to vaporize the alcohol, and condensing the alcohol vapors.

2. In the process of treating garbage, the combination of steps consisting in cooking the garbage until dextrinization results, mixing water with the dried garbage, producing alcoholic fermentation of the mixture, heating the mixture to vaporize the alcohol, and condensing the alcohol vapors.

3. In the process of treating garbage, the combination of steps consisting in cooking the garbage until dry, condensing the watery vapour given off during the drying operation, grinding the dried material, mixing the ground material with the condensate, producing alcoholic fermentation of the mixture, heating the mixture to vaporize the alcohol, and condensing the alcohol vapors.

4. In the process of treating garbage, the combination of steps consisting in cooking the garbage, to liquefy some of the fats, expressing the fats thus liquefied, cooking the remaining material until dextrinization results, grinding the dried material, mixing water with the ground material, producing alcoholic fermentation of the mixture, heating the mixture to vaporize the alcohol, and condensing the alcohol vapors.

5. In the process of treating garbage, the combination of steps consisting in driving off watery vapour from the garbage until dextrinization results, condensing some of the watery vapour, producing alcoholic fermentation of the condensate, heating the condensate to vaporize the alcohol, and condensing the alcohol vapors.

Signed at Los Angeles, California, this 1st day of August, 1918.

MAHLON E. FAUST.

Witnesses:
GEORGE H. HILES,
L. BELLE WEAVER.